United States Patent
Nakajo

(10) Patent No.: US 11,382,149 B2
(45) Date of Patent: Jul. 5, 2022

(54) METHOD FOR ESTABLISHING WIRELESS COMMUNICATION

(71) Applicant: MURATA MACHINERY, LTD., Kyoto (JP)

(72) Inventor: Natsuko Nakajo, Kyoto (JP)

(73) Assignee: MURATA MACHINERY, LTD., Kyoto (JP)

(*) Notice: Subject to any disclaimer, the term of this patent is extended or adjusted under 35 U.S.C. 154(b) by 17 days.

(21) Appl. No.: 17/269,279

(22) PCT Filed: Jul. 4, 2019

(86) PCT No.: PCT/JP2019/026565
§ 371 (c)(1),
(2) Date: Feb. 18, 2021

(87) PCT Pub. No.: WO2020/044786
PCT Pub. Date: Mar. 5, 2020

(65) Prior Publication Data
US 2021/0251024 A1 Aug. 12, 2021

(30) Foreign Application Priority Data

Aug. 30, 2018 (JP) .............................. JP2018-161084

(51) Int. Cl.
*H04W 76/10* (2018.01)
*H04W 4/70* (2018.01)
*H04W 40/02* (2009.01)

(52) U.S. Cl.
CPC .............. *H04W 76/10* (2018.02); *H04W 4/70* (2018.02); *H04W 40/02* (2013.01)

(58) Field of Classification Search
CPC .. A62B 1/10; B65G 43/08; B66B 5/00; B66B 3/00; B66B 11/0415; G05B 19/0428;
(Continued)

(56) References Cited

U.S. PATENT DOCUMENTS

2006/0262807 A1* 11/2006 Aoki .................. G05B 19/0428
370/451
2018/0157239 A1    6/2018 Bordegnoni et al.
2019/0187658 A1*   6/2019 Fischer .............. G05B 19/4184

FOREIGN PATENT DOCUMENTS

CN       106502230 A   *  3/2017
JP       2011-067892 A    4/2011
(Continued)

OTHER PUBLICATIONS

Official Communication issued in International Patent Application No. PCT/JP2019/026565, dated Sep. 10, 2019.

*Primary Examiner* — Daniel Lai
(74) *Attorney, Agent, or Firm* — Keating & Bennett, LLP

(57) ABSTRACT

A portable operation interface transmits an instruction to switch an operation mode to a stacker crane with an automatic operation mode and a manual operation mode via a first wireless communication route. A second receiver is connected to the stacker crane. For example, a portable operation interface including a portable remote controller wirelessly transmits to the second receiver a connection request to establish wireless communication in the second wireless communication route. The second wireless communication route is a different route from the first wireless communication route. The second receiver that receives the connection request determines whether a first condition that the stacker crane is in the manual operation mode is satisfied. The second receiver establishes wireless communication via the second wireless communication route with the portable operation interface when it is determined that the first condition is satisfied.

10 Claims, 10 Drawing Sheets

(58) Field of Classification Search
CPC .............. G05B 19/4185; G05B 19/409; G05B 2219/23161; G05B 2219/24168; G05B 2219/37095; G05B 19/102; G05B 2219/31027; G05B 2219/31088; G06Q 10/063114; G08C 17/02; H04L 43/06; H04L 45/22; H04L 43/12; H04L 12/66; H04W 4/70; H04W 40/02; H04W 40/24; H04W 76/10; H04W 76/18; H04W 76/00; H04M 11/00; H04Q 9/00

See application file for complete search history.

(56) References Cited

FOREIGN PATENT DOCUMENTS

| | | |
|---|---|---|
| JP | 2011-067894 A | 4/2011 |
| JP | 2015-023496 A | 2/2015 |
| JP | 5807619 B2 | 11/2015 |

\* cited by examiner

METHOD FOR ESTABLISHING WIRELESS COMMUNICATION

BACKGROUND OF THE INVENTION

1. Field of the Invention

The present invention relates to a method for establishing wireless communication between communication devices that perform wireless communication.

2. Description of the Related Art

Conventionally, wireless communication is known to communicate via radio waves, light, etc., without using wired cables. Japanese Patent Application Laid-Open No. 2015-23496 discloses a communication system for performing wireless communication.

In the communication system of Japanese Patent Application Laid-Open No. 2015-23496, when a main device is turned on and the pairing information is not retained, the main processor of the main device automatically searches for a partner device existing in the vicinity of the main device and working in pairing mode. The main processor identifies partner devices having a specific device name and performs a pairing process to the device having the specific device name.

In the configuration of Japanese Patent Application Laid-Open No. 2015-23496, when the power of the main device is turned on and the pairing information is not retained, the pairing operation is automatically started. Therefore, pairing is automatically performed and wireless communication is established when the user does not specifically intend to do so, which may cause unforeseen consequences.

SUMMARY OF THE INVENTION

Preferred embodiments of the present invention provide methods for establishing wireless communication that each establish wireless communication only under appropriate circumstances.

Problems to be solved by various preferred embodiments of the present invention are as described above, and next, features to address the problems and effects thereof will be described.

According to a preferred embodiment of the present invention, in a method for establishing wireless communication, a second wireless communication route between an operation-side communication device and a machine-side communication device is established. The operation-side communication device transmits an instruction to switch an operation mode to the industrial machine including an automatic operation mode and a manual operation mode via a first wireless communication route. The machine-side communication device is connected to the industrial machine. The method includes a connection request step and a second wireless communication route establishment step. In the connection request step, the operation-side communication device wirelessly transmits a connection request which is a request to establish wireless communication in the second wireless communication route to the machine-side communication device. In the second wireless communication route establishment step, the machine-side communication device determines whether a connection establishment condition is satisfied or not, and if the connection establishment condition is satisfied, the machine-side communication device establishes the wireless communication in the second wireless communication route with the operation-side communication device in response to the connection request. In the second wireless communication route establishment step, in a case where the connection establishment condition is not satisfied, the wireless communication in the second wireless communication route with the operation-side communication device is not established even if the connection request is transmitted. Satisfying a first condition which is a condition in which the industrial machine is in the manual operation mode is required to satisfy the connection establishment condition, and the operation mode of the industrial machine is able to be switched by a transmission of the instruction to switch the operation mode via the first wireless communication route.

Accordingly, in a case where the industrial machine is not operating in the manual operation mode, communication by the second wireless communication route is not able to be established unless the operation mode is switched to the manual operation mode. Thus, the occurrence of unexpected operation is able to be prevented and avoided, which significantly increases the operator's sense of security.

The connection request may include operation-side communication device identification information to identify the operation-side communication device. In order for the connection establishment condition to be satisfied, in addition to satisfaction of the first condition being satisfied, a second condition is required to be satisfied, and the second condition is a condition in which the operation-side communication device identification information included in the connection request is registered beforehand in the machine-side communication device as a permitted communication partner.

This prevents the establishment of wireless communication between the operation-side communication device and the machine-side communication device that is not intended by the operator.

In the method for establishing wireless communication, it is preferred that, in order for the connection establishment condition to be satisfied, in addition to satisfaction of the first condition, a third condition is required to be satisfied, and the third condition is a condition in which the wireless communication in the second wireless communication route is not already established with another operation-side communication device.

Accordingly, prevention of an unstable situation in which a single industrial machine is able to be operated simultaneously by multiple operation-side communication devices is achieved.

If the third condition is not satisfied, the machine-side communication device may wirelessly transmit the operation-side communication device identification information to identify the other operation-side communication device with which wireless communication is already established with the machine-side communication device. The operation side communication device displays the identification information of the other operation-side communication device received from the machine-side communication device on a display of the operation-side communication device.

Accordingly, the operator is able to easily ascertain the information of other operation-side communication device communicating with the machine-side communication device via the second wireless communication route.

In the second wireless communication route establishment step, the machine-side communication device may wirelessly transmit information indicating a reason why the connection establishment condition is not satisfied to the operation-side communication device when the connection establishment condition is not satisfied. The operation-side communication device displays the reason received from the machine-side communication device on a display of the operation-side communication device.

Accordingly, the operator is able to easily ascertain the cause of the problem when the operation-side communication device is unable to establish wireless communication with the machine-side communication device.

The operation-side communication device may include a portable terminal and a remote controller. The portable terminal includes a first operation interface. The remote controller is connected to the portable terminal via a wired cable and includes a second operation interface. The industrial machine is connected to a reception communication device that receives the operation mode switching instruction transmitted by the operation-side communication device. The first wireless communication route is established between the portable terminal and the reception communication device, and the first operation information indicating the operation of the first operation interface is transmitted from the portable terminal. The second wireless communication route is established between the remote controller and the machine-side communication device, and the second operation information indicating the operation of the second operation interface is transmitted from the remote controller.

Accordingly, two different communication routes are able to be secured, and emergency stop signals and other signals are able to be transmitted immediately in an emergency.

The portable terminal may be a tablet. The first operation interface may be a touch panel integrated with the display of the portable terminal.

This makes it easy for the operator to check various information and to operate the system.

In the method for establishing wireless communication described above, it is preferred that the second operation information includes an enable signal that enables the first operation information.

Thus, by transmitting the enable signal indicating the operation of the second operation interface, which enables the operation of the first operation interface, through a communication route different from the first operation information, the reliability of remote operation by wireless communication is able to be significantly improved.

In the method for establishing wireless communication described above, it is preferred that the second operation information includes an emergency stop signal.

Accordingly, the emergency stop signal is able to be transmitted by a different communication route from the first operation information, thus further ensuring reliability in an emergency.

According to another preferred embodiment of the present invention, a wireless communication system includes an operation-side communication device and a machine-side communication device. The operation-side communication device transmits an instruction to switch an operation mode to the industrial machine including an automatic operation mode and a manual operation mode via a first wireless communication route. The machine-side communication device is connected to the industrial machine. When establishing a second wireless communication route between the operation-side communication device and the machine-side communication device, the operation-side communication device wirelessly transmits a connection request which is a request to establish wireless communication in the second wireless communication route to the machine-side communication device. The machine-side communication device determines whether a connection establishment condition is satisfied or not, and if the connection establishment condition is satisfied, the machine-side communication device establishes the wireless communication in the second wireless communication route with the operation-side communication device in response to the connection request. The machine-side communication device determines whether a connection establishment condition is satisfied or not, and if the connection establishment condition is not satisfied, the wireless communication in the second wireless communication route with the operation-side communication device is not established even if the connection request is transmitted. Satisfying a first condition which is a condition in which the industrial machine is in the manual operation mode is required to satisfy the connection establishment condition, and the operation mode of the industrial machine is able to be switched by a transmission of the instruction to switch the operation mode via the first wireless communication route.

Accordingly, in a case where the industrial machine is not operating in the manual operation mode, communication by the second wireless communication route is not able to be established unless the operation mode is switched to the manual operation mode. Thus, the occurrence of unexpected operation is prevented, which significantly increases the operator's sense of security.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

Figure 1:
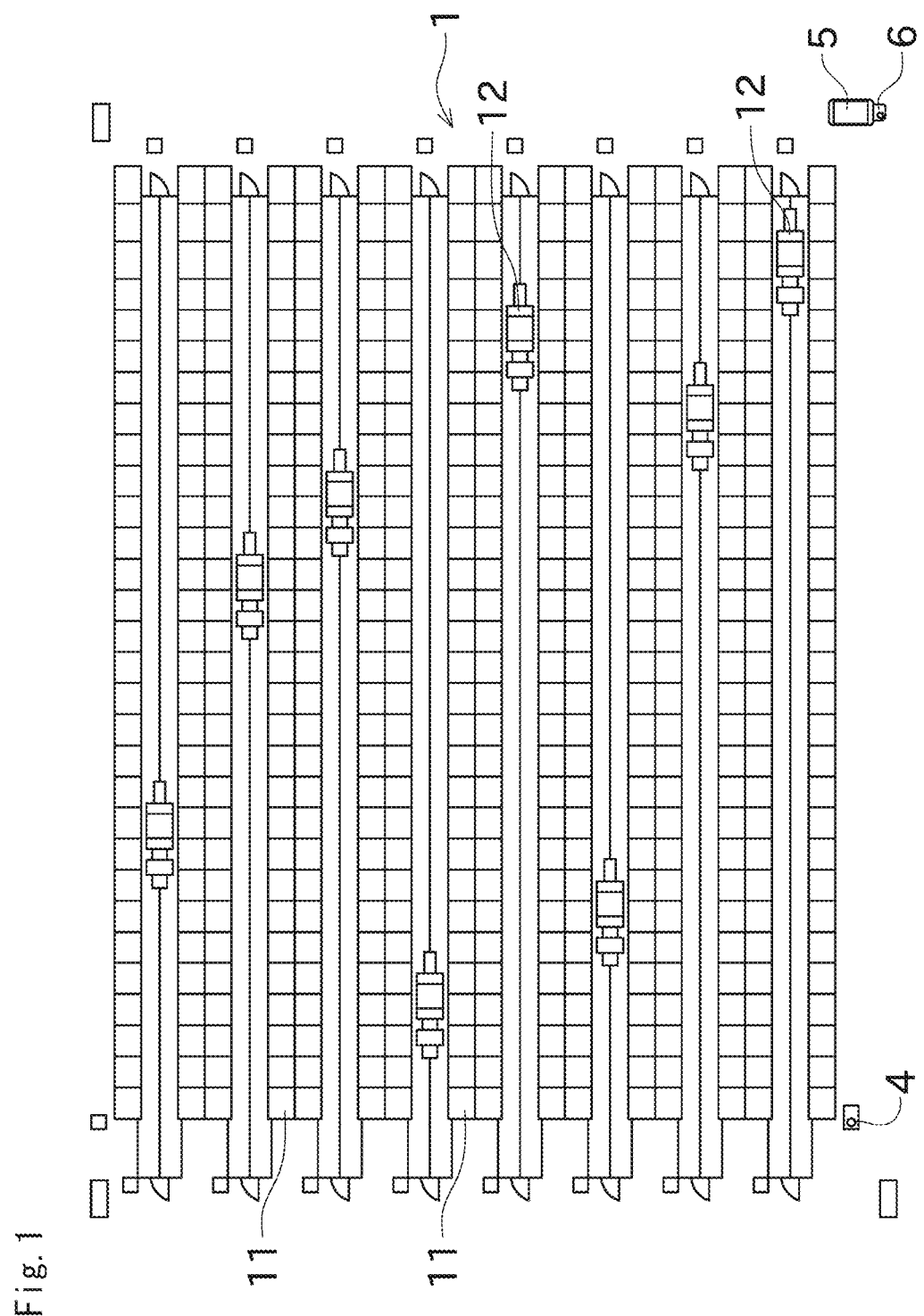
FIG. 1 is a plan view showing an automated warehouse in which a method for establishing wireless communication is performed according to a preferred embodiment of the present invention.
Figure 2:
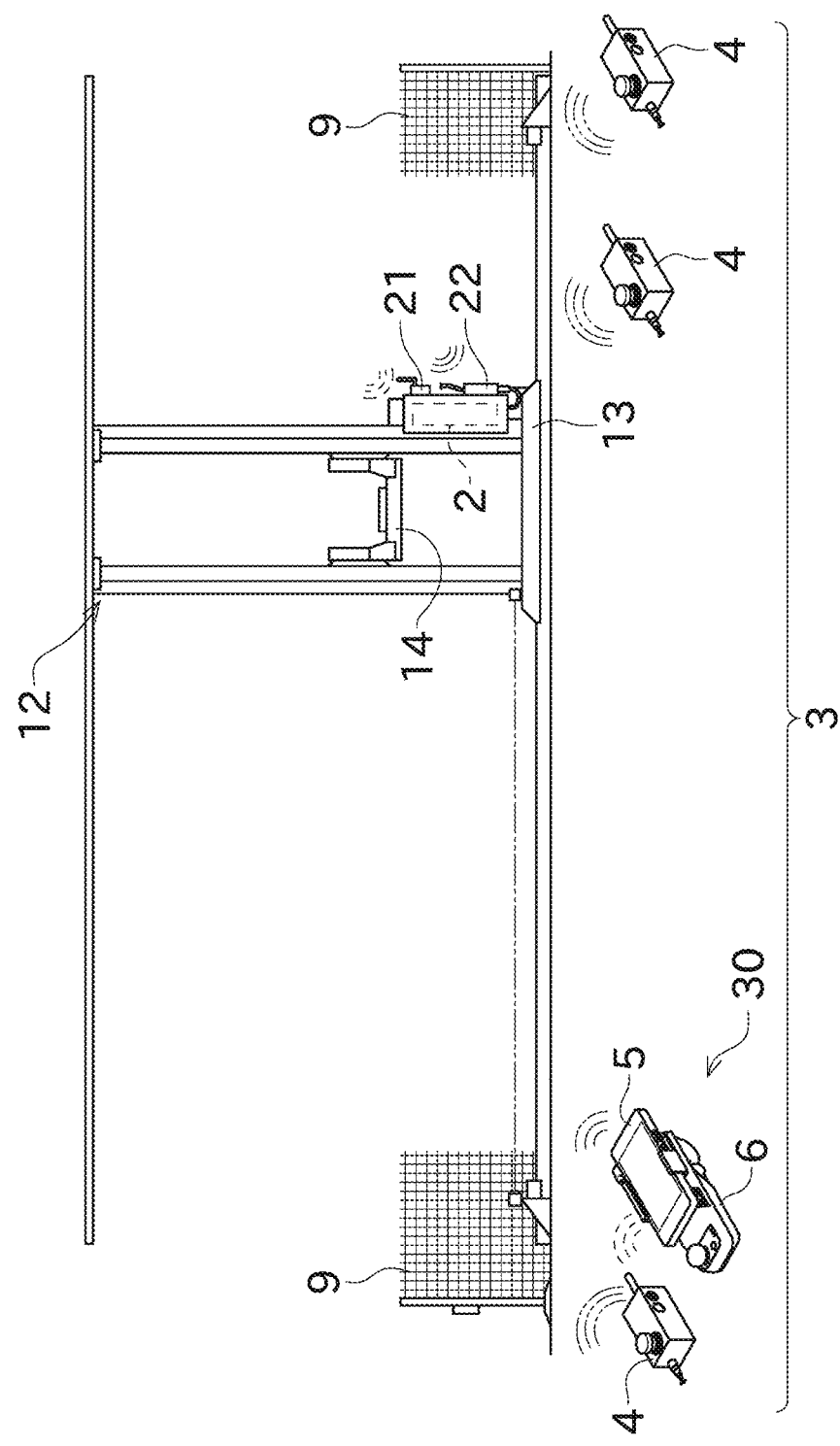
FIG. 2 is a diagram illustrating one of stacker cranes included in the automated warehouse.
Figure 3:
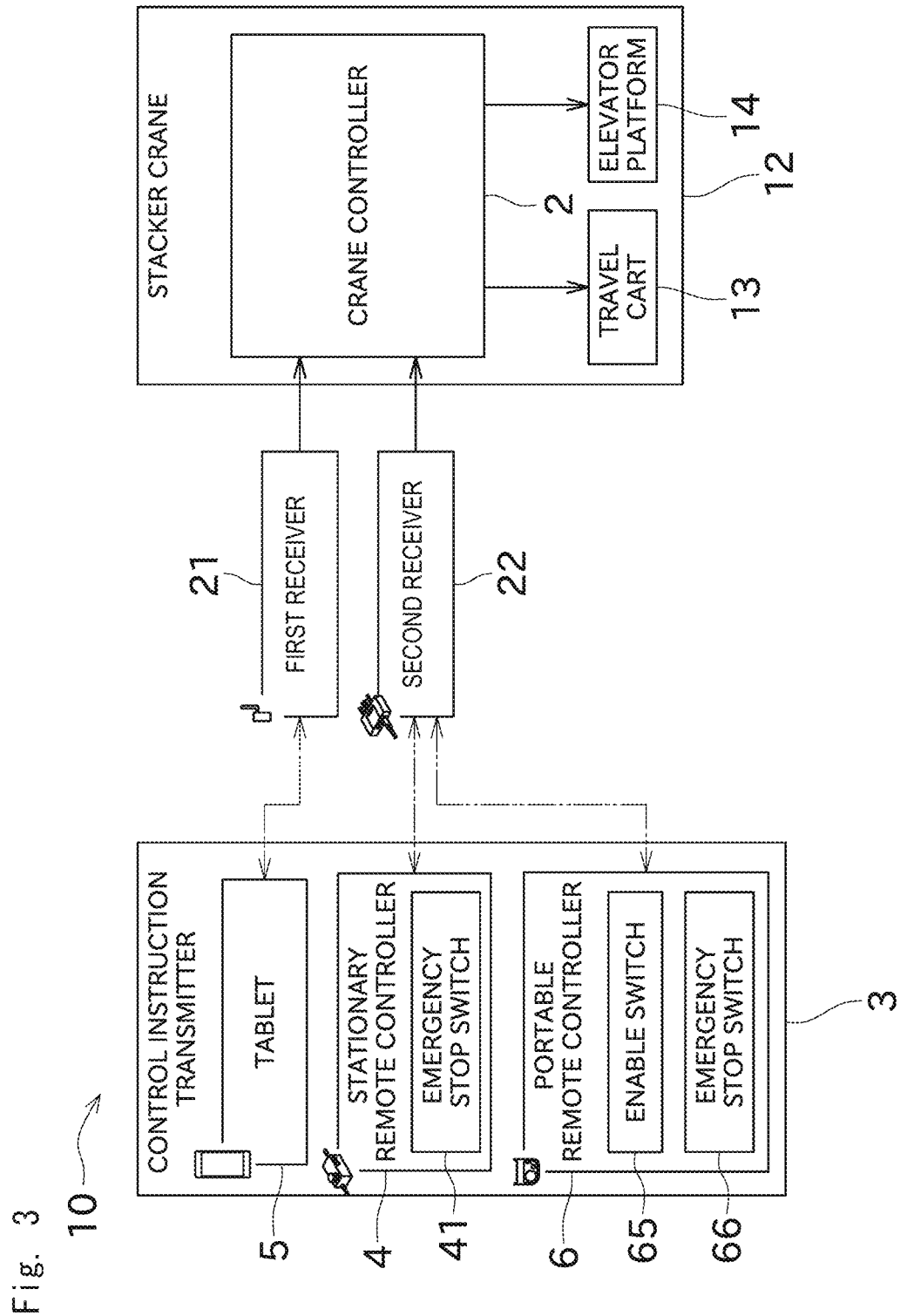
FIG. 3 is a block diagram showing a control system of the stacker crane.
Figure 4:
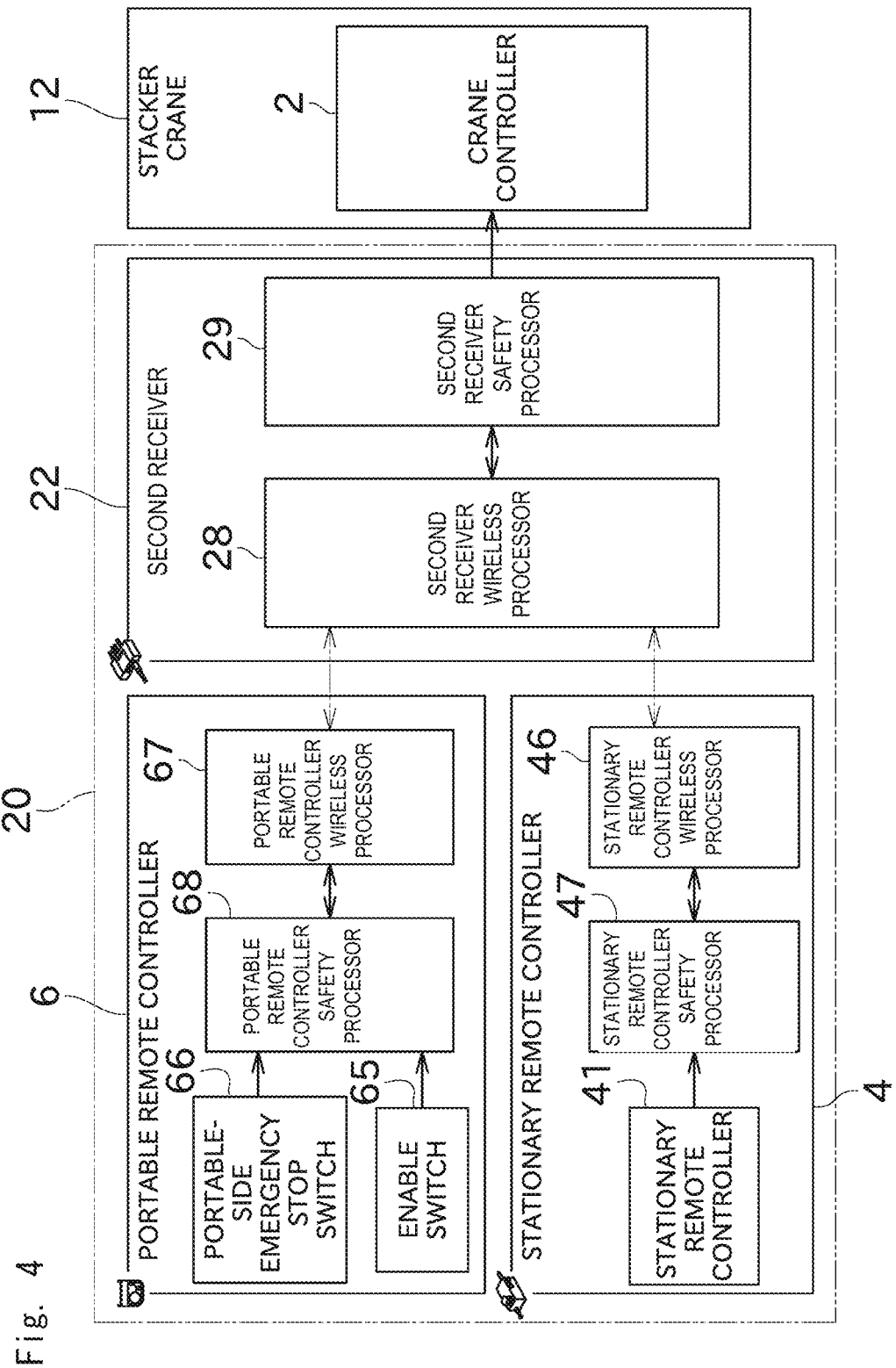
FIG. 4 is a block diagram showing a safety signal system.

Hereinafter, preferred embodiments of the present invention will be described with reference to the drawings. FIG. 1 is a plan view showing an automated warehouse 1 in which a method for establishing wireless communication is performed according to a preferred embodiment of the present invention. FIG. 2 is a diagram illustrating one of stacker cranes 12 included in the automated warehouse 1. FIG. 3 is a block diagram showing a control system 10 of the stacker crane 12. FIG. 4 is a block diagram showing a safety signal system 20.

The automated warehouse 1 shown in FIG. 1 includes a plurality of stacker racks 11 and a plurality of stacker cranes (industrial machines) 12. The stacker racks 11 have many storage spaces that are able to store goods, for example, parts and materials. The stacker cranes 12 automatically load/unload goods into/from the storage spaces of the stacker racks 11. Through the stacker cranes 12, the automated warehouse 1 can automatically store goods into the stacker racks 11, and can automatically unload goods stored in the stacker racks 11.

As shown in FIG. 2, each of the stacker cranes 12 includes: a travel cart 13 that travels along a track; an elevator platform 14 able to ascend and descend vertically; and a crane controller (machine controller) 2 that controls operations of the travel cart 13 and the elevator platform 14.

In operating the stacker crane 12, its operation mode can be selected from an automatic operation mode and a manual operation mode. In the automatic operation mode, the stacker crane 12 automatically operates in accordance with a pre-programmed rule. In the manual operation mode, the stacker crane 12 operates in accordance with an operation instruction input by an operator.

The crane controller 2 shown in FIG. 2 and FIG. 3 includes known controllers, for example, a CPU, a ROM, a RAM, and an input/output interface. The ROM stores various programs, data (rules) relating to an automatic operation, and the like. The CPU is able to read out the various programs, etc. from the ROM, and execute them.

When the automatic operation mode is selected as the operation mode of the stacker crane 12, the crane controller 2 controls operations of the travel cart 13 and the elevator platform 14 based on the stored data relating to the automatic operation, and the like.

When the manual operation mode is selected as the operation mode of the stacker crane 12, the crane controller 2 controls operations of the travel cart 13 and the elevator platform in accordance with an operation instruction provided by the operator and a state signal of each switch. The operation instruction is received via a first receiver 21. The state signal is received via a second receiver 22.

In the automated warehouse 1, an area including an operation area of the stacker crane 12 is partitioned by a fence 9 or the like, as shown in FIG. 2, to prevent goods from being touched, for example. The partitioned area is defined as a restricted area. In order to detect the operator entering the operation area maintenance work, etc., a sensor is located at a door in the fence 9, for example. The door and sensor are not shown in FIG. 2. If the sensor detects the door being opened while the stacker crane 12 is operating in the automatic operation mode, the operation of the stacker crane 12 automatically stops.

The automated warehouse 1 includes the first receiver (reception communication device) 21 and the second receiver (machine-side communication device) 22. The first receiver 21 and the second receiver 22, each of which is a communication device, are installed near the crane controller 2 of the stacker crane 12. The first receiver 21 and the second receiver 22 are electrically connected to the crane controller 2. One stacker crane 12 is provided with one first receiver 21 and one second receiver 22.

The first receiver 21 wirelessly communicates with a tablet 5, which will be described later, via a wireless LAN. The wireless LAN includes a plurality of wireless communication channels, and uses a radio wave, an infrared ray, or the like to transmit data. In this preferred embodiment, Wi-Fi (registered trademark) is used as the wireless LAN. This wireless communication allows the first receiver 21 to receive an operation instruction (first operation information) that is inputted to the tablet 5 by the operator operating the tablet 5. Examples of the operation instruction include an instruction to make the travel cart 13 travel, an instruction to ascend or descend the elevator platform 14, and the like. The first receiver 21 outputs a signal indicating an instruction to the crane controller 2, the signal defining and functioning as a control signal to control operations of the stacker crane 12.

The second receiver 22 wirelessly communicates with a stationary remote controller 4 and a portable remote controller 6, which will be described later, via a wireless LAN. In this preferred embodiment, Wi-Fi (registered trademark) is used as the wireless LAN. This wireless communication allows the second receiver 22 to receive various state signals (second operation information). Examples of the state signal include a state signal indicating a state of an emergency stop switch, a state signal indicating a state of an enable switch that enables an operation instruction input from the tablet 5, and the like. The second receiver 22 outputs the received state signal to the crane controller 2, the received state signal defining and functioning as a control signal to control operations of the stacker crane 12. The first receiver 21 and the second receiver 22 communicate on different frequency bands or different channels.

Figure 5:
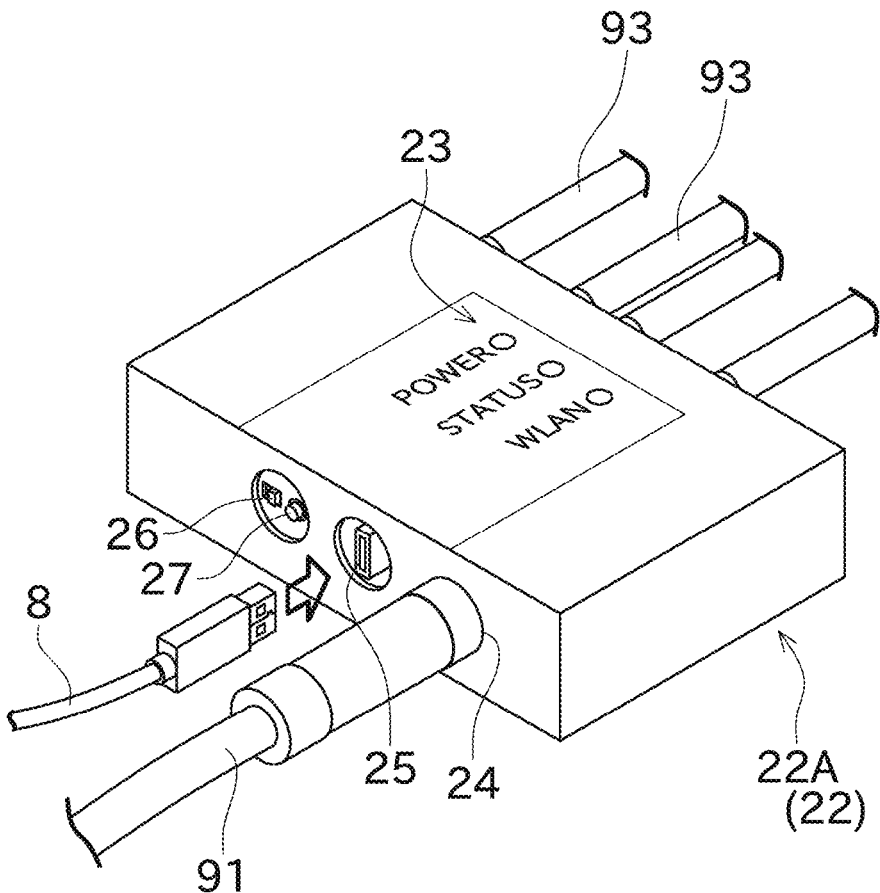
FIG. 5 is a perspective view showing a second receiver.

Next, the second receiver 22 will be detailed with reference to FIG. 5. FIG. 5 is a perspective view showing the second receiver 22.

As shown in FIG. 5, the second receiver 22 includes a second receiver state display 23, a second receiver power connector 24, a second receiver USB connector 25, a second receiver maintenance switch 26, and a confirm button 27.

The second receiver state display 23 includes three lamps, namely, a power indicator lamp, a status lamp, and a WLAN lamp. Each of the lamps is an LED. The second receiver state display 23 indicates various operation states of the second receiver 22 by combinations of lighting colors and lighting states (lighting or blinking) of the LEDs.

A power cable 91 is connected to the second receiver power connector 24. Through the power cable 91, electric power necessary for operations of the second receiver 22 is supplied. The power cable 91 includes a plurality of electric wires. The power cable 91 not only supplies electric power but also defines and functions as a signal cable to input and output signals. In the second receiver 22 of this preferred embodiment, a power switch is omitted. Powering on/off the second receiver 22 is implemented by attachment/detachment of the power cable 91 to/from the second receiver power connector 24. It however may be acceptable that the second receiver 22 includes a power switch.

The second receiver 22 includes a connector (not shown) for electrical connection of an antenna cable 93, in addition to the second receiver power connector 24. A wireless antenna (not shown) for transmission and reception of radio waves is connected to the antenna cable 93.

The second receiver USB connector 25 is used for connection of a USB cable (wired cable) 8. Through the USB cable 8, the second receiver 22 can be connected by wire to the tablet 5 which will be described later. The USB cable 8 defines and functions as a data communication cable. The operator is able to confirm a state of the second receiver 22 via the tablet 5 connected to the second receiver 22. The operator is also able to provide various instructions to the second receiver 22 by operating the tablet 5.

The second receiver maintenance switch 26 is defined by a slide switch, for example. Sliding the second receiver maintenance switch 26 allows the second receiver 22 to be switched between two operation modes, namely, a normal mode and a maintenance mode. The normal mode of the second receiver 22 is an operation mode used in manually or automatically operating the stacker crane 12, and the maintenance mode thereof is an operation mode used in performing an initial setting and various settings.

Changing the operation mode by the second receiver maintenance switch 26 is enabled by once powering off the second receiver 22 and then powering on the second receiver 22 again.

As shown in FIG. 4, the second receiver 22 includes a second receiver wireless processor 28 and a second receiver safety processor 29. The second receiver wireless processor 28 and the second receiver safety processor 29, which are connected by a UART for example, perform serial communication. The UART is short for Universal Asynchronous Receiver/Transmitter.

The second receiver wireless processor 28, which is a computer (specifically, a wireless communication module), includes a CPU, a ROM, a RAM, and the like. The second receiver wireless processor 28 wirelessly communicates with the stationary remote controller 4 and with the portable remote controller 6.

The second receiver safety processor 29, which is a computer, includes a CPU, a ROM, a RAM, and the like. The second receiver safety processor 29 is used as a function safety controller. To be specific, the second receiver safety processor 29 determines whether or not to shift to a safe state where the stacker crane 12 does not operates, based on a result of communication between the second receiver wireless processor 28 and the stationary remote controller 4 and between the second receiver wireless processor 28 and the portable remote controller 6. Then, if necessary, the second receiver safety processor 29 outputs a safe state request signal to the crane controller 2.

As shown in FIG. 3, the automated warehouse 1 of this preferred embodiment is provided with a control instruction transmitter 3 that enables the operator to provide instructions to the stacker crane 12. The control instruction transmitter 3 is able to wirelessly communicate with the crane controller 2 via a wireless LAN, for example, through the first receiver 21 and the second receiver 22. Upon the operator operating the control instruction transmitter 3, the control instruction transmitter 3 transmits an instruction in accordance with the operation, to the crane controller 2 through the first receiver 21 and the second receiver 22.

Figure 6:
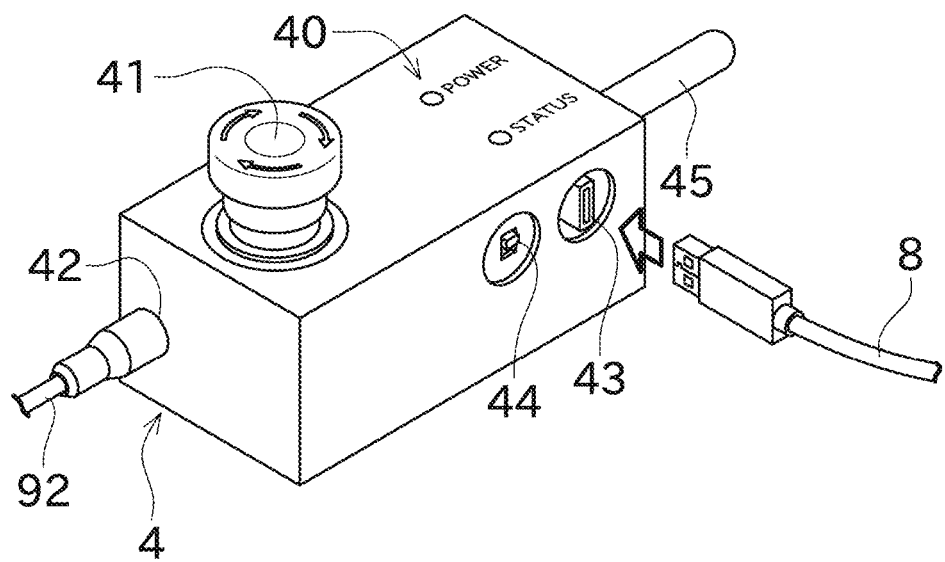
FIG. 6 is a perspective view showing a stationary remote controller.
Figure 7:
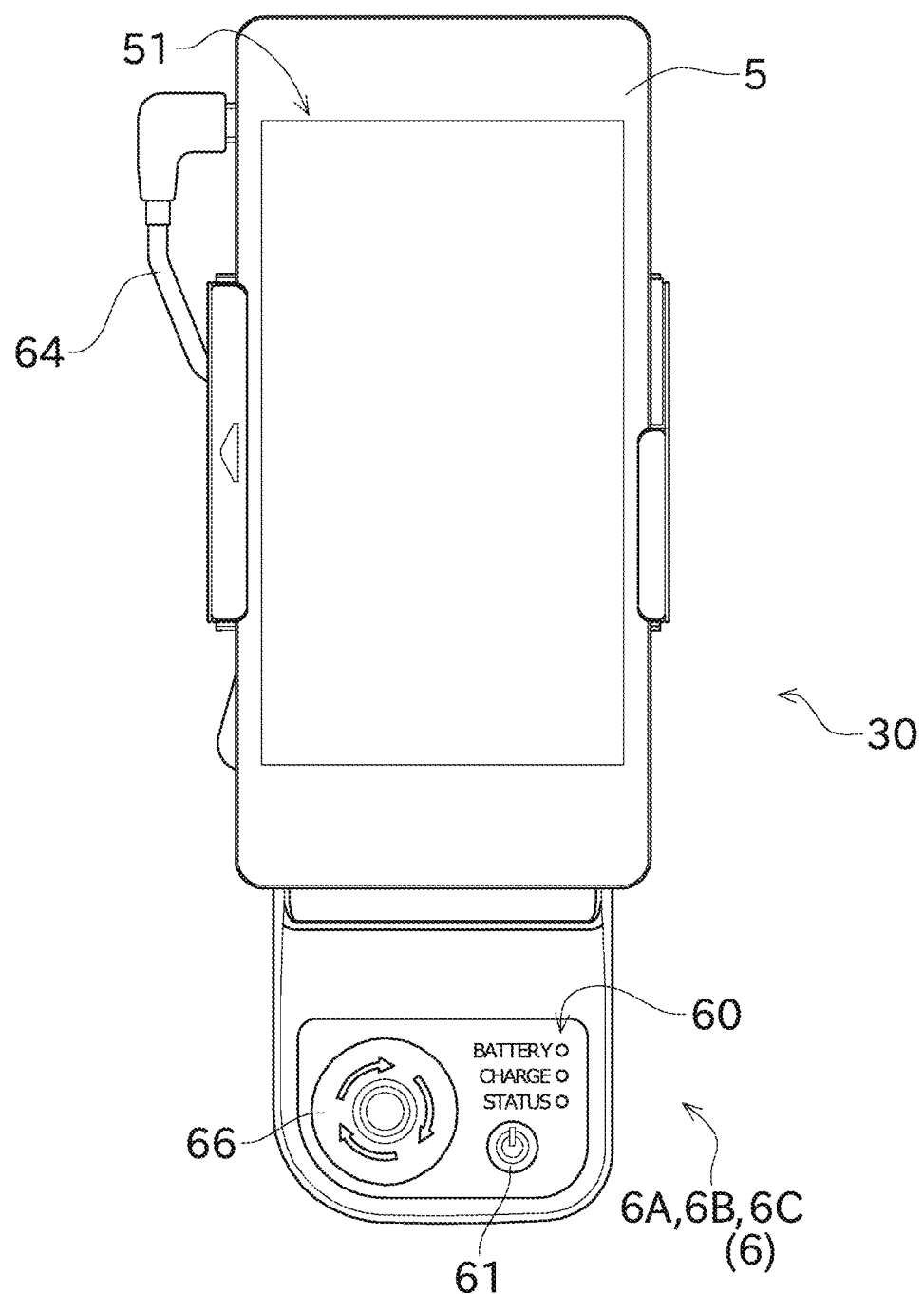
FIG. 7 is a front view of a portable operation interface including a tablet attached to a portable remote controller.
Figure 8:
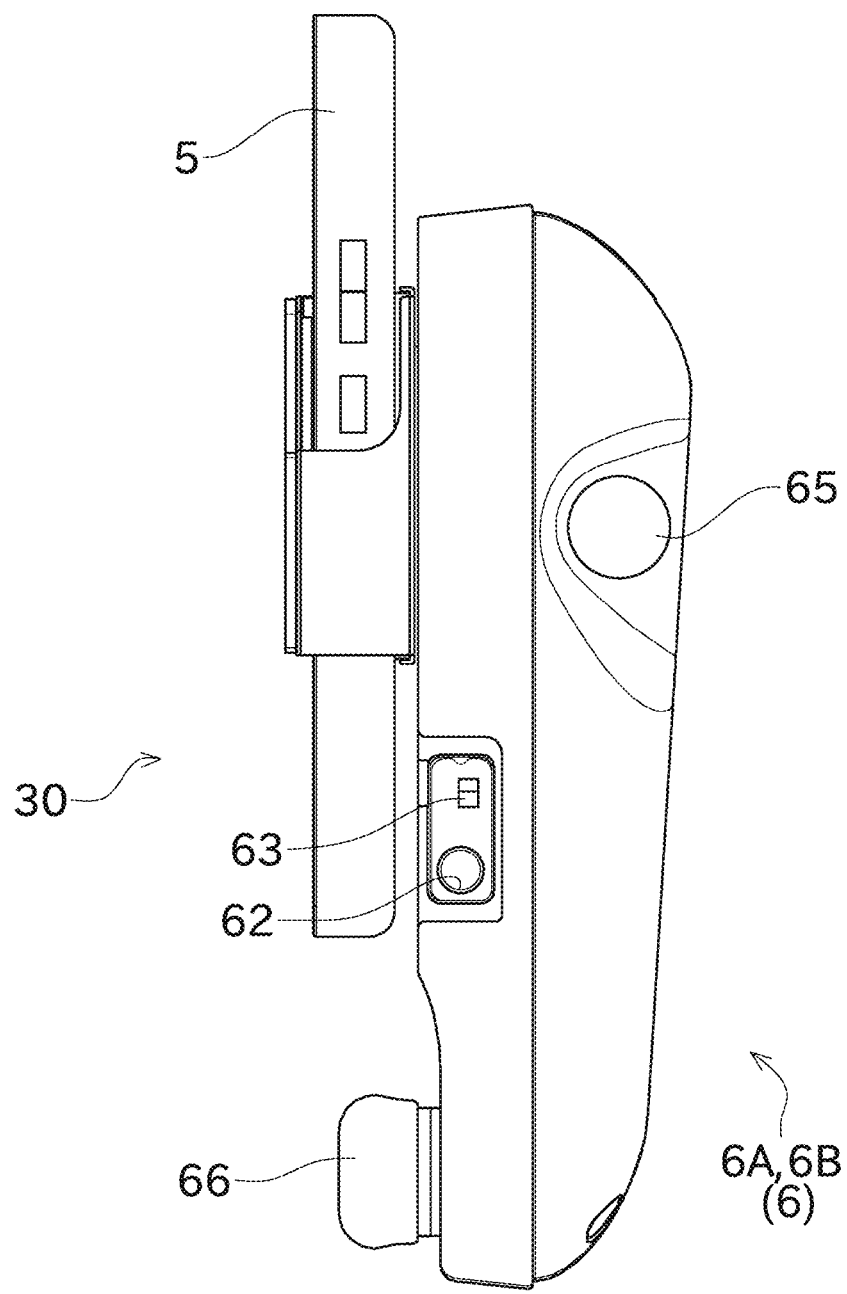
FIG. 8 is a side view of a portable operation interface.

The control instruction transmitter 3 includes the stationary remote controller 4 shown in FIG. 6 and a portable operation interface (operation-side communication device) 30 shown in FIG. 7 and FIG. 8. The portable operation interface 30 includes the tablet (portable terminal) 5 and the portable remote controller (remote controller) 6.

The stationary remote controller 4 will be detailed with reference to FIG. 6. FIG. 6 is a perspective view showing the stationary remote controller 4.

The stationary remote controller 4 is fixed at the outside of the fence 9, for example, so that the operator is able to operate the stationary remote controller 4 at a location outside the operation area of the automated warehouse 1. The stationary remote controller 4 is operated when the operation of the stacker crane 12 needs to be stopped promptly in a case of emergency.

As shown in FIG. 6, the stationary remote controller 4 includes a stationary remote controller state display 40, a stationary-side emergency stop switch 41, a stationary remote controller power connector 42, a stationary remote controller USB connector 43, a stationary remote controller maintenance switch 44, and a wireless antenna 45.

As shown in FIG. 6, the stationary remote controller state display 40 includes two lamps, namely, a power indicator lamp and a status lamp. Each of the lamps is an LED. The stationary remote controller state display 40 indicates various operation states of the stationary remote controller 4 by combinations of lighting colors and lighting states (lighting or blinking) of the LEDs.

The stationary-side emergency stop switch 41 is defined by a push button switch. The stationary-side emergency stop switch is located on a front surface of the stationary remote controller 4. The stationary-side emergency stop switch 41 is pressed when the stacker crane 12 needs to be stopped emergently. Once the stationary-side emergency stop switch 41 is pressed, the stationary-side emergency stop switch 41 is kept in the pressed state even after the operating force is removed therefrom. Rotating to the right or pulling the stationary-side emergency stop switch 41 releases the pressed state.

In a state where the stationary-side emergency stop switch 41 is pressed, the stationary remote controller 4 transmits, to the second receiver 22, an emergency stop signal that is a state signal indicating the emergency stop switch being on. In a state where the stationary-side emergency stop switch 41 is not pressed, the stationary remote controller 4 transmits, to the second receiver 22, a non-stop signal that is a state signal indicating the emergency stop switch being off.

A power cable 92 is connected to the stationary remote controller power connector 42. Through the power cable 92 connected to the stationary remote controller power connector 42, electric power necessary for operations of the stationary remote controller 4 is supplied. In the stationary remote controller 4 of this preferred embodiment, disconnecting the power cable 92 from an external power source or disconnecting the power cable 92 from the stationary remote controller power connector 42 causes the stationary remote controller 4 to be powered off. This however is not limiting and it may also be acceptable that the stationary remote controller 4 includes a power switch that enables switching power-on/power-off.

The stationary remote controller USB connector 43 is used to connect the USB cable 8. Through the USB cable 8, the stationary remote controller 4 can be connected by wire to the tablet 5. The operator is able to confirm a state of the stationary remote controller 4 via the tablet 5 connected to the stationary remote controller 4. The operator is also able to provide various instructions to the stationary remote controller 4 by operating the tablet 5.

The stationary remote controller maintenance switch 44 is defined by a slide switch, for example. Sliding the stationary remote controller maintenance switch 44 allows the stationary remote controller 4 to be switched between a normal mode and a maintenance mode. The normal mode of the stationary remote controller 4 is an operation mode in which the stacker crane 12 can be stopped emergently, and the maintenance mode thereof is an operation mode used in performing an initial setting and various settings. Changing the operation mode by the stationary remote controller maintenance switch 44 is enabled by once powering off the stationary remote controller 4 and then powering on the stationary remote controller 4 again.

The wireless antenna 45, which is a rod-shaped antenna, is able to perform transmission and reception of radio waves.

As shown in FIG. 4, the stationary remote controller 4 includes a stationary remote controller wireless processor 46 and a stationary remote controller safety processor 47. The stationary remote controller wireless processor 46 and the stationary remote controller safety processor 47, which are connected by a UART for example, perform serial communication.

The stationary remote controller wireless processor 46, which is a computer (specifically, a wireless communication module), includes a CPU, a ROM, a RAM, and the like. The stationary remote controller wireless processor 46 wirelessly communicates with the second receiver wireless processor 28 included in the second receiver 22.

The stationary remote controller safety processor 47, which is a computer, includes a CPU, a ROM, a RAM, and the like. The stationary remote controller safety processor 47 is provided as a function safety processor. The stationary remote controller safety processor 47 is electrically connected to the stationary-side emergency stop switch 41. The stationary remote controller safety processor 47 outputs a state signal indicating a state of the stationary-side emergency stop switch 41 to the stationary remote controller wireless processor 46.

The tablet 5, which is included in the portable operation interface 30, is a known tablet computer that includes a CPU, a ROM, a RAM, and an input/output interface. The tablet 5 is provided with a touch panel display (first operation interface) 51. The touch panel display 51 integrates a touch panel (operation interface), which is operated by the operator by touching it with a finger, and a display, which shows various information.

The tablet 5, which has a built-in wireless antenna (not shown), is able to wirelessly communicate with the first receiver 21 as shown in FIG. 3. In accordance with an operation performed by the operator, the tablet 5 wirelessly transmits, to the first receiver 21, various types of instruction, for example, an instruction to switch the operation mode of the stacker crane 12 and an operation instruction to move the stacker crane 12 while the stacker crane 12 is in the manual operation mode.

The tablet 5 can be connected by wire to each of the stationary remote controller 4, the portable remote controller 6, and the second receiver 22 via a USB cable (for example, the USB cable 8 shown in FIG. 5). The tablet 5 is able to display various types of information on each of the above communication devices to which the tablet 5 is connected, and also able to output a control instruction to operate the communication device to the communication device. That is, by being connected to each communication device, the tablet 5 provides a man-machine interface for the communication device.

The portable remote controller 6 is used in combination with the tablet 5, to control operations of the stacker crane 12 while the stacker crane 12 is in the manual operation mode. The portable remote controller 6, which has a built-in wireless antenna (not shown), is able to perform wireless communication with the second receiver 22 as shown in FIG. 3, etc.

Referring to FIG. 7 and FIG. 8, the portable remote controller 6 includes a portable remote controller state display 60, a power button 61, a remote controller power connector 62, a remote controller maintenance switch 63, a USB cable (wired cable) 64, an enable switch 65, and a portable-side emergency stop switch 66. The enable switch 65 and the portable-side emergency stop switch 66 correspond to a second operation interface.

As shown in FIG. 7, the portable remote controller state display 60 includes three lamps, namely, a power indicator lamp, a charge lamp, and a status lamp. Each of the lamps is an LED. The portable remote controller state display 60 indicates various operation states of the portable remote controller 6 by combinations of lighting colors and lighting states (lighting or blinking) of the LEDs.

The power button 61 is a push button switch. Pressing the power button 61 can switch the presence or absence of electric power supply from a rechargeable battery (not shown) included in the portable remote controller 6. Accordingly, powering on/off the portable remote controller 6 is implemented.

A cable (not shown) to charge the rechargeable battery described above is able to be connected to the remote controller power connector 62.

The remote controller maintenance switch 63 is defined by a slide switch, for example. Sliding the remote controller maintenance switch 63 allows the portable remote controller 6 to be switched between two operation modes, namely, a normal mode and a maintenance mode. The normal mode of the portable remote controller 6 is an operation mode to operate the stacker crane 12 while the stacker crane 12 is in the manual operation mode. The maintenance mode thereof is an operation mode used in performing an initial setting and various settings. Changing the operation mode by the remote controller maintenance switch 63 is enabled by once powering off the portable remote controller 6 and then powering on the portable remote controller 6 again.

The USB cable 64 is extended from a housing of the portable remote controller 6. The USB cable 64, which is a data communication cable, can be connected to the tablet 5. The tablet is attached to a holder included in the portable remote controller 6 and the USB cable 64 is connected to the tablet 5. This allows the tablet 5 and portable remote controller 6 to cooperate and function as the portable operation interface 30.

The enable switch 65 is defined by a push button switch, for example. The enable switch 65 is located at a side surface of the portable remote controller 6, and the operator is able to press the enable switch 65 while holding the portable remote controller 6 with one of his/her hand. While the stacker crane 12 is in the manual operation mode, pressing the enable switch 65 with a certain degree of operating force is required, in order to make the operator recognize that the operation of the stacker crane 12 is permitted. Even after being pressed, the enable switch 65 returns from the pressed state to its original state if the operating force is removed. Accordingly, in a case of the operator falling into an unexpected situation, for example, tumbling, the operation of the stacker crane 12 is able to be immediately set as unpermitted.

In a state where the enable switch 65 is pressed, the portable remote controller 6 transmits, to the second receiver 22, an enable signal that is a state signal indicating the enable switch being on. In a state where the enable switch 65 is not pressed, the portable remote controller 6 transmits, to the second receiver 22, a disable signal that is a state signal indicating the enable switch being off.

In this preferred embodiment, the enable switch 65 is a 3-position switch. In a case where the operator presses the enable switch 65 with a strong force as well as a case where the enable switch 65 is not pressed, the portable remote controller 6 transmits the disable signal to the second receiver 22. Accordingly, the operation of the stacker crane 12 is able to be stopped appropriately in a case of emergency, even though the operator keeps touching the enable switch 65 with his/her finger and rather strongly presses the enable switch 65 by reflex.

The portable-side emergency stop switch 66 is a push button switch, for example. The portable-side emergency stop switch 66 is located at a front surface of the portable remote controller 6. The portable-side emergency stop switch 66 is pressed when the stacker crane 12 needs to be stopped emergently while the stacker crane 12 is in the manual operation mode. Once the portable-side emergency stop switch 66 is pressed, the portable-side emergency stop switch 66 is kept in the pressed state even after the operating force is removed therefrom. Rotating or pulling the portable-side emergency stop switch 66 to the right releases the pressed state.

In a state where the portable-side emergency stop switch 66 is pressed, the portable remote controller 6 transmits, to the second receiver 22, an emergency stop signal that is a state signal indicating the emergency stop switch being on. In a state where the portable-side emergency stop switch 66 is not pressed, the portable remote controller 6 transmits, to the second receiver 22, a non-stop signal that is a state signal indicating the emergency stop switch being off.

As shown in FIG. 4, the portable remote controller 6 includes a portable remote controller wireless processor 67 and a portable remote controller safety processor 68. The portable remote controller wireless processor 67 and the portable remote controller safety processor 68, which are connected by a UART for example, perform serial communication.

The portable remote controller wireless processor 67, which is a computer (specifically, a wireless communication module), includes a CPU, a ROM, a RAM, and the like. The portable remote controller wireless processor 67 wirelessly communicates with the second receiver wireless processor 28 included in the second receiver 22.

The portable remote controller safety processor 68, which is a computer, includes a CPU, a ROM, a RAM, and the like. The portable remote controller safety processor 68 is provided as a function safety processor. The portable remote controller safety processor 68 is electrically connected to the enable switch 65 and the portable-side emergency stop switch 66. The portable remote controller safety processor 68 outputs a state signal indicating states of the enable switch 65 and the portable-side emergency stop switch 66 to the portable remote controller wireless processor 67.

As thus far described, the automated warehouse 1 of this preferred embodiment includes the safety signal system (wireless communication system) 20 separately from a transmission/reception system (the first receiver 21 and the tablet 5) to transmit and receive operation instructions to operate the stacker crane 12. The safety signal system (wireless communication system) 20 transmits and receives an enable signal that enables an operation instruction provided to the stacker crane 12 and an emergency stop signal that is provided in a case of emergency. The safety signal system 20 is defined by the second receiver 22, the stationary remote controller 4, and the portable remote controller 6, as shown in FIG. 4.

Focusing on the wireless communication routes, when the stacker crane 12 is operated in the manual operation mode, signals are exchanged between the crane controller 2 and the portable operation interface 30 operated by the operator through two wireless communication routes. The first wireless communication route is established between the first receiver 21 and the tablet 5. The second wireless communication route is established between the second receiver 22 and the portable remote controller 6.

Thus, since the wireless communication routes of the signals of the operation instructions to control the operation of the stacker crane 12 and the signals indicating the status of the enable switch 65 and the portable-side emergency stop switch 66 are separated, the emergency stop signal or the like can be transmitted to the second receiver 22 without delay in an emergency, and the stacker crane 12 can be stopped securely and immediately.

In this preferred embodiment, in addition to the signal system for the operation instructions of stacker crane 12, the safety signal system 20 performs wireless communication. This provides easy handling because there is no risk that a signal cable will be caught on a machine. In addition, the portable operation interface 30 can be lightened by a weight corresponding to the signal cable. Consequently, a burden on the operator can be reduced.

Due to the characteristics of wireless communication that do not need any physical coupling between communication devices with a signal cable and thus allow connection partners to be easily changed, it is difficult for the operator to intuitively recognize which communication device is in communication with a certain communication device.

Next, a registration operation of registering a permitted communication partner will be described in detail. This operation is necessary before the safety signal system 20 described above starts working.

Registering a permitted communication partner means that each of the stationary remote controller 4, the portable remote controller 6, and the second receiver 22 preliminarily registers identification information on a partner that is permitted to communicate with the stationary remote controller 4 itself, the portable remote controller 6 itself, or the second receiver 22 itself, the registration being made in a situation that allows the operator to confirm the registration. Two communication devices, by mutually registering partner's identification information, are permitted to perform wireless communication to implement the safety signal system 20.

The identification information may be in any form, as long as it can uniquely identify the stationary remote controller 4, the portable remote controller 6 and the second receiver 22. In this preferred embodiment, information obtained by properly processing a MAC address is used as the identification information. Hereinafter, this identification information may be referred to as ID.

The registration operation of a permitted communication partner can be performed as follows, for example, when the second receiver 22 is registered as a permitted communication partner of the portable remote controller 6. (1) The ID of the second receiver 22 to be registered as a permitted communication partner of the portable remote controller 6 is input to the portable remote controller 6 by an appropriate method. (2) The portable remote controller 6 transmits the input ID to the second receiver 22 by wireless communication. (3) The second receiver 22 compares the received ID with the ID of the own device, and returns the result of the determination whether the IDs match or not to the portable remote controller 6. (4) When the portable remote controller 6 receives the determination result indicating that both IDs match, the portable remote controller 6 registers the ID of the second receiver 22 as the ID of the permitted communication partner, subject to a predetermined operation of the second receiver 22 by the operator.

In order to communicate with the second receiver 22, the respective portable remote controller 6 is used as a portable operation interface 30 with the tablet 5 attached. Accordingly, in relation to the second receiver 22, the portable remote controller 6 can be regarded as identical to the portable operation interface 30 including the portable operation interface 6. Registering the ID of the portable remote controller 6 to the second receiver 22 as a permitted communication partner is substantially synonymous with registering the corresponding portable operation interface 30 as a permitted communication partner. In the following description, the portable remote controller 6 may also substantially mean the portable operation interface 30.

The above work is able to be performed in substantially the same process to register the second receiver 22 as a permitted communication partner in the stationary remote controller 4. Similar features apply when registering a portable remote controller 6 or a stationary remote controller 4 to the second receiver 22 as a permitted communication partner.

In this preferred embodiment, one portable remote controller 6 is allowed to register two or more second receivers 22 as permitted communication partners. Accordingly, the operator operating the one portable remote controller 6 is able to provide instructions while switching from one to another among the second receivers 22 that are registered as the communication partners. Accordingly, the versatility of the portable remote controller 6 can be increased.

One second receiver 22 is allowed to register two or more portable remote controllers 6 and two or more stationary remote controllers 4 as permitted communication partners. The operator operates any of the portable remote controllers 6 or the stationary remote controllers 4 that is established the wireless communication with the second receiver 22, and thus is able to provide instructions, for example, an instruction to stop the corresponding stacker crane 12.

One stationary remote controller 4 is allowed to register only one second receiver 22 as a permitted communication partner. Considering that the stationary remote controller 4 is fixedly installed unlike the portable remote controller 6, the stationary remote controller 4 is not allowed to change its communication partner, the second receiver 22. This can make the operation simple.

In order that the portable remote controller 6 or the second receiver 22 can register two or more permitted communication partners, the above-described registration operation is repeated with different communication devices as partners.

Next, the pairing state, which is a premise for wireless connection, will be described.

When an operator carrying the portable remote controller (portable operation interface 30) wishes to move the stacker crane 12 in the manual operation mode, the operator operates the tablet 5 in the state attached to the portable remote controller 6 as shown in FIG. 7 to select the second receiver 22 corresponding to the stacker crane 12 as a connection partner. Accordingly, communication is appropriately performed between the portable remote controller 6 and the selected second receiver 22, and the second receiver 22 to which the portable remote controller 6 is connected (and thus the crane controller 2 of the stacker crane 12 to be operated) is determined.

The state in which the connection partner of one portable remote controller 6 is fixed to one second receiver 22 is a state in which a one-to-one pair is provided, and is a pairing state (partner fixed state). The aforementioned permitted communication partner can also be referred to as a candidate (pairing candidate) for the partner to be in a pairing state. Two or more handheld remote controls 6 cannot be in a pairing state simultaneously for one second receiver 22.

In order to be in a pairing state, it is necessary that the second receiver 22 is pre-registered as a permitted connection partner in the portable remote controller 6 and that the portable remote controller 6 is pre-registered as a permitted communication partner in the second receiver 22 of the connection partner. After the pairing state, the wireless connection between the portable remote controller 6 and the second receiver 22 is immediately established.

The pairing state is a concept used to limit a partner which can be established the wireless connection. In the pairing state, the portable remote controller 6 that can operate the second receiver 22 is only one portable remote controller 6 which is the communication partner of the second receiver 22 (in other words, only one portable remote controller 6 which is the pair of the second receiver 22). Accordingly, no other portable remote controller 6 can be connected to the second receiver 22. This prevents an unstable situation in which multiple persons can operate the same stacker crane 12 at the same time.

When the operation of the stacker crane 12 by the tablet 5 and the portable remote controller 6 is finished, the operator operates the tablet 5 to instruct the portable remote controller to disconnect the wireless connection. As a result, the communication between the portable remote controller 6 and the second receiver 22 is performed accordingly, the wireless connection is disconnected, and the pairing state is canceled at about the same time.

Thus, being in the pairing state or not being in the pairing state is almost the same as the presence or absence of the establishment of the wireless connection. In the following, unless otherwise noted, the pairing state is started upon the establishment of the wireless connection, and the pairing state is cancelled upon disconnection of the wireless connection. However, if the wireless connection, once established, is disconnected without operator instruction (e.g., due to deteriorating signal conditions), the pairing state is not canceled. Accordingly, even in the event of an unintended disconnection between the portable remote controller 6 and the second receiver 22, no other portable remote controller 6 can connect to the second receiver 22 until the wireless connection is disconnected at the instruction of the operator after the wireless connection is re-established between the portable remote controller 6 and the second receiver 22. This ensures that the portable remote controller 6 that establishes the wireless connection with the second receiver 22 is prevented from switching unexpectedly.

Next, the operation of the stationary remote controller 4 and the portable remote controller 6 in the automatic operation mode and the manual operation mode will be described.

The stationary remote controller 4 is always in a state of established wireless communication with the second receiver 22, regardless of whether the operation mode of the stacker crane 12 is the automatic operation mode or the manual operation mode.

All of the one or more stationary remote controllers 4 registered with the second receiver 22 as the permitted communication partner establish the wireless connection with the second receiver 22, and the status of the stationary-side emergency stop switch 41 can always be transmitted to the second receiver 22. Conversely, the crane controller 2 does not operate the stacker crane 12, either in the automatic operation mode or in the manual operation mode, if all of the stationary remote controllers registered as permitted communication partners could not establish the wireless connection with the second receiver 22.

On the other hand, the portable remote controller 6 can establish the wireless connection with the second receiver 22 only when the operation mode of the stacker crane 12 is the manual operation mode. Accordingly, the operator can operate the portable operation interface 30 to manually move the stacker crane 12 only when the stacker crane 12 is in the manual operation mode.

In the manual operation mode, the portable remote controller 6 can establish the wireless connection with the second receiver 22 to transmit the status of the enable switch 65 and the portable-side emergency stop switch 66 only when necessary. That is, in the manual operation mode, the portable remote controller 6 can establish the wireless connection with the second receiver and also disconnect the wireless connection at a timing instructed by the operator, if the second receiver 22 is registered as the permitted communication partner.

The stationary remote controller 4 can establish the wireless connection with the second receiver 22 even when another stationary remote controller 4 establishes the wireless connection with the second receiver 22. The portable remote controller 6 can establish the wireless connection with the second receiver 22 even when one or more stationary remote controllers 4 establish the wireless connection with the second receiver 22.

However, when one portable remote controller 6 establishes the wireless connection with the second receiver 22, other portable remote controllers 6 cannot establish the wireless connection with the second receiver 22. Therefore, the stacker crane 12 is not able to be moved by more than one portable operation interface 30 at the same time.

Next, the conditions required to operate the stacker crane 12 in the manual operation mode by the tablet 5 and the portable remote controller 6 will be described below.

First, in order to manually move the stacker crane 12 by the tablet 5 and the portable remote controller 6, the stacker crane 12 must be in a manual operation mode beforehand. In other words, when the stacker crane 12 is in the automatic operation mode, the stacker crane 12 cannot be manually moved by the tablet 5 and the portable remote controller 6.

Figure 9:
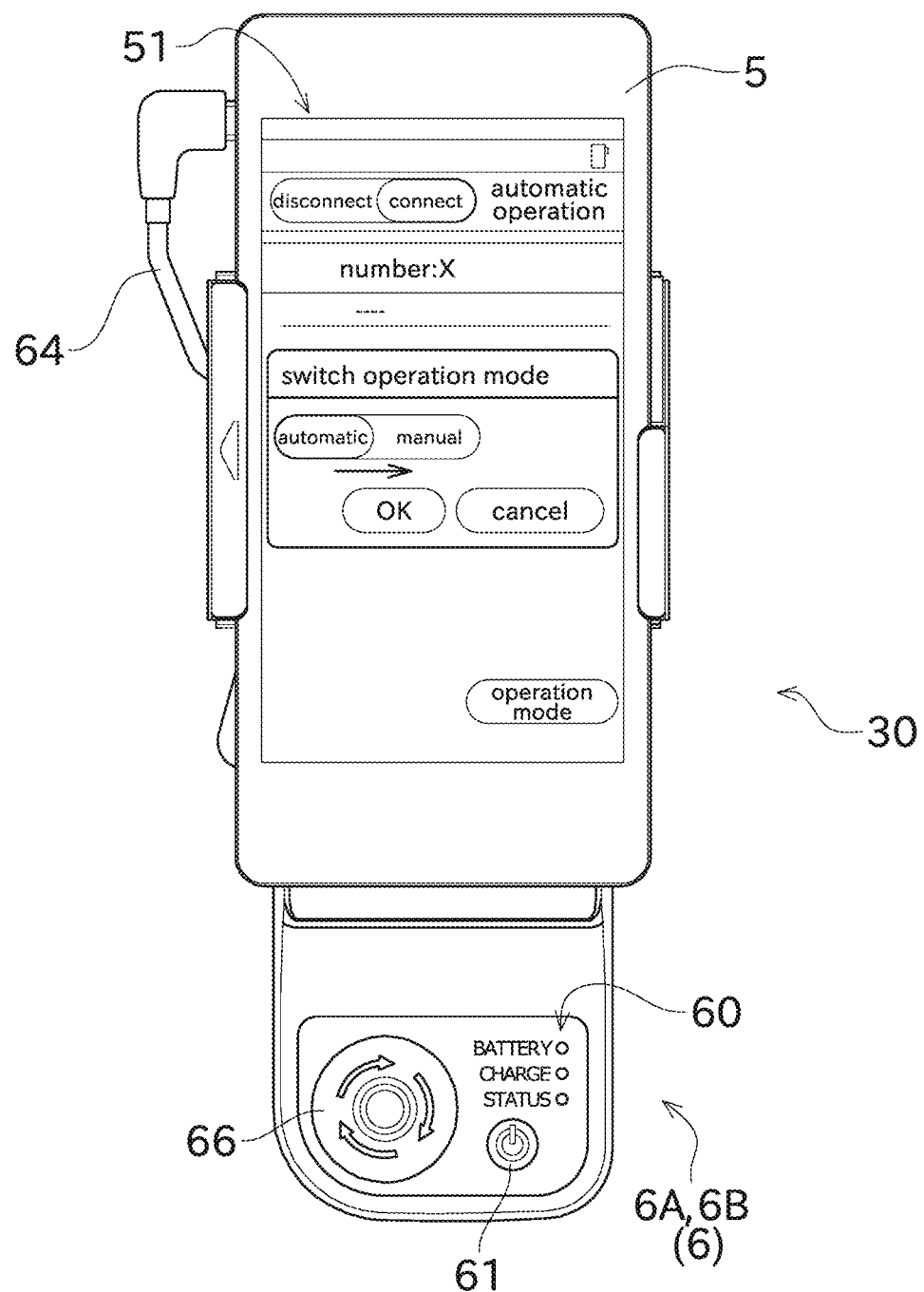
FIG. 9 is an example of an operation screen of a tablet to switch an operation mode of a stacker crane.

The operation of switching the operation mode of the stacker crane 12 can be performed, for example, as follows. The operator selects a switch operation mode by operating the tablet 5, then an operation mode switching dialog is displayed as shown in FIG. 9. At this time, the tablet 5 may or may not be attached to the portable remote controller 6.

A widget that resembles a toggle switch is displayed in the operation mode switching dialog. If the operator wishes to switch from the automatic operation mode to the manual operation mode, the operator swipes the toggle switch to slide from "Automatic" to "Manual" and then taps the "OK" button. In response to this instruction, the tablet 5 transmits a mode switch instruction which switches the operation mode of the stacker crane 12 to the manual operation mode, to the first receiver 21 via the first wireless communication route. The first receiver 21 switches the operation mode of the stacker crane 12 from the automatic operation mode to the manual operation mode in accordance with the mode switching instruction.

Secondly, in order to manually move the stacker crane 12 by using the tablet 5 and the portable remote controller 6, it is necessary that the portable remote controller 6 is registered in advance in the second receiver 22 as a permitted communication partner. It is necessary that the second receiver 22 is registered in advance in the portable remote controller 6 as a permitted communication partner. This registration process is described above.

Third, in order to manually move the stacker crane 12 by using the tablet 5 and a certain portable remote controller 6, it is necessary that the second receiver 22 does not establish the wireless communication with the portable remote controllers 6 other than the certain portable remote controller 6. In other words, the second receiver 22 is not in the pairing state with the portable remote controllers 6 other than the certain portable remote controller 6.

The processing of the second receiver 22 from the time when the portable remote controller 6 transmits a connection request to the time when the portable remote controller 6 can control the stacker crane 12 will be described below with reference to FIG. 10.

Figure 10:
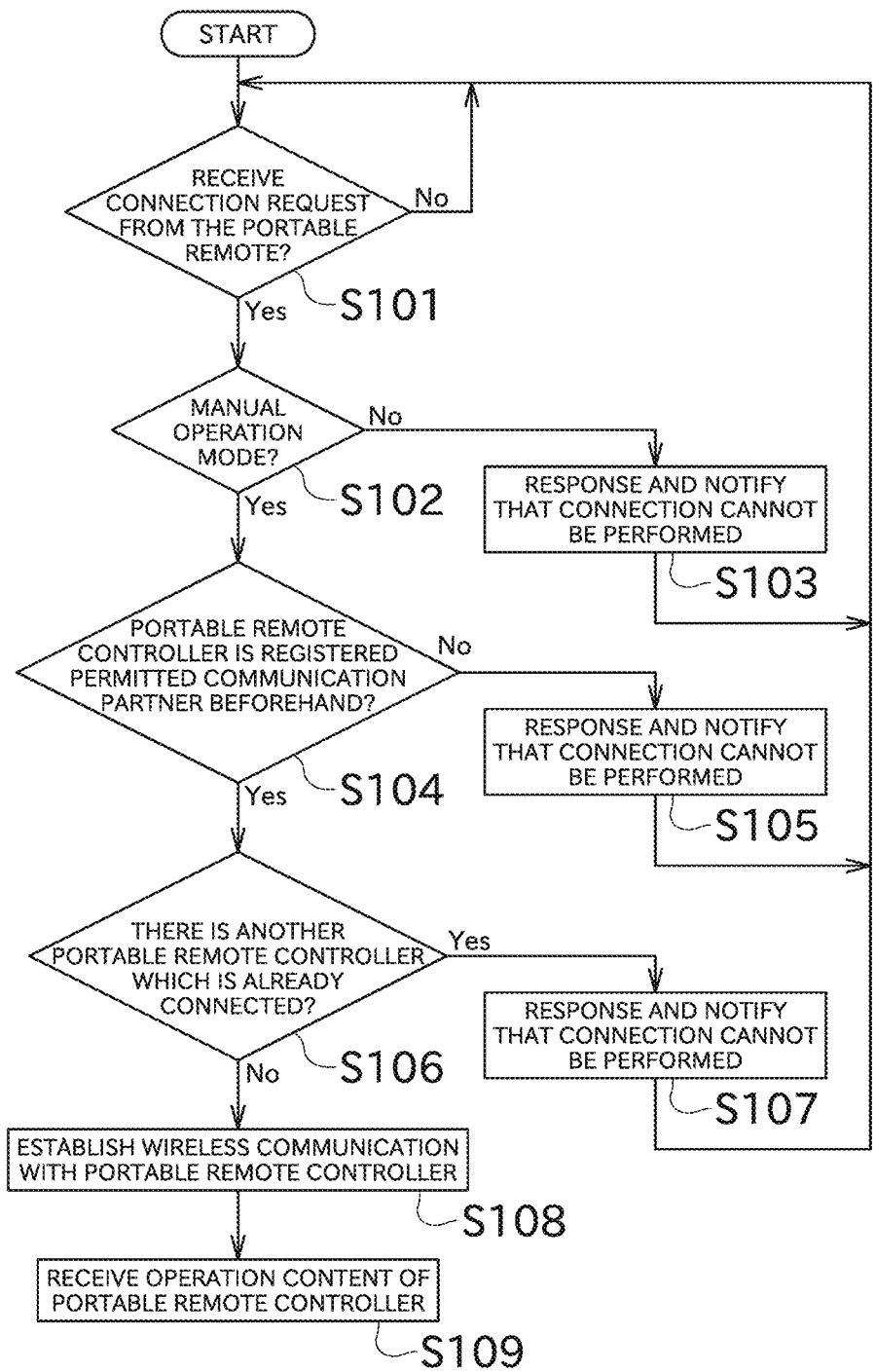
FIG. 10 is a flowchart showing processes of a second receiver that determines conditions for establishing a wireless connection with a portable remote controller.

As shown in FIG. 10, the second receiver 22 waits until the connection request of the portable remote controller 6 is received (step S101).

The operator intending to connect the portable remote controller 6 to the second receiver 22 operates the tablet 5 to instruct the portable remote controller 6 to connect to the second receiver 22. The portable remote controller 6, which is instructed to connect, wirelessly transmits the connection request including its ID to the second receiver 22 (connection request step). The ID of the portable remote controller 6 transmitted from the portable remote controller 6 to the second receiver 22 corresponds to the operation-side communication device identification information.

Upon receiving the connection request from the portable remote controller 6 in the step S101, the second receiver 22 determines whether the predetermined connection establishment condition (requirement) is satisfied. In this preferred embodiment, the connection establishment condition is that a first condition, a second condition and a third condition are all fulfilled. The details of each condition are described below.

First, the second receiver 22 determines whether the stacker crane 12 is in the manual operation mode by querying the crane controller 2 of the stacker crane 12 (step S102). Whether or not the stacker crane 12 is in the manual operation mode corresponds to the first condition.

As a result of the determination of the step S102, if the stacker crane 12 is not in the manual operation mode, the second receiver 22 transmits information indicating that the connection cannot be performed to the portable remote controller 6 as a response to the connection request (step S103). The second receiver 22 includes information indicating the reason why the connection cannot be performed (specifically, that the stacker crane 12 is in the automatic operation mode) in the information transmitted to the portable remote controller 6. The portable remote controller 6 displays on the screen of the tablet 5 that the connection to the second receiver 22 cannot performed because the stacker crane 12 is in the automatic operation mode. Thus, the operator can understand that the operation mode of the stacker crane 12 needs to be switched to the manual operation mode in order to connect to the second receiver 22.

As a result of the determination of the step S102, when the stacker crane 12 is in the manual operation mode, the second receiver 22 determines whether the ID of the portable remote controller 6 included in the received connection request is included in the registered permitted communication partners beforehand (step S104). Whether or not the ID of the portable remote controller 6 is pre-registered as a permitted communication partner in the second receiver 22 corresponds to the second condition.

As a result of the determination in the step S104, when the ID of the portable remote controller 6 is not registered as a permitted communication partner in the second receiver 22, the second receiver 22 transmits information indicating that the connection cannot be performed to the portable remote controller 6 as a response to the connection request (step S105). The second receiver 22 includes information indicating a reason why the connection cannot be performed (specifically, that the portable remote controller 6 is not registered as a permitted communication partner in the second receiver 22) in the information transmitted to the portable remote controller 6. The portable remote controller 6 displays on the screen of the tablet 5 that the portable remote controller 6 cannot be connected to the second receiver 22 because the portable remote controller 6 is not registered as a permitted communication partner of the second receiver 22. Thus, the operator can understand that the portable remote controller 6 needs to be registered as a permitted communication partner with the second receiver 22 in order to connect to the second receiver 22.

As a result of the determination of the step S104, when the ID of the portable remote controller 6 is registered as a permitted communication partner in the second receiver 22, the second receiver 22 determines whether the second receiver 22 is currently already connected to a portable remote controller 6 other than the portable remote controller 6 relating to the current connection request (step S106). Whether or not the second receiver 22 is already connected to another portable remote controller 6 corresponds to the third condition.

As a result of the determination of the step S106, when the second receiver 22 is already connected to another portable remote controller 6, the second receiver 22 transmits information indicating that the connection cannot be performed to the portable remote controller 6 as a response to the connection request. The second receiver 22 includes, in the information to be transmitted to the portable remote controller 6, information indicating the reason why the connection cannot be performed (specifically, that another portable remote controller 6 is already connected to the second receiver 22) and information of the ID of the other portable remote controller 6 that is already connected to the second receiver 22. The portable remote controller 6 displays, on the screen of the tablet 5, the fact that the portable remote controller 6 cannot connect to the second receiver 22 because another portable remote controller 6 is already connected to the second receiver 22, and displays the ID of the portable remote controller 6 that is already connected. Thus, the operator can understand that the connection to the second receiver 22 needs to be disconnected in the other portable remote controller 6 in order to connect to the second receiver 22.

As a result of the determination of the step S106, the second receiver 22 is not connected to another portable remote controller 6, the second receiver 22 performs a connection process to communicate wirelessly with the portable remote controller 6 (step S108). After the connection process is completed, the portable remote controller 6 turns on the status lamp provided by the portable remote controller state display 60 to green. Further, the portable remote controller 6 displays on the screen of the tablet 5 that the portable remote controller 6 is connected to the second receiver 22. Accordingly, the operator can understand that the stacker crane 12 is in a state where the manual operation using the tablet 5 and the portable remote controller 6 move the stacker crane 12 by checking the status lamp of the portable remote controller 6 and the screen of the tablet 5.

Then, the operator operates the tablet 5 and the portable remote controller 6. The first receiver 21 receives a signal based on the operation of the tablet 5 and controls the stacker crane 12 via the crane controller 2. In parallel, the second receiver 22 receives a signal based on the operation of the portable remote controller 6 to control the stacker crane 12 via the crane controller 2 (step S109). Specifically, the second receiver 22 transmits a status confirmation signal at a predetermined time interval to the connected portable remote controller 6. The portable remote controller 6 receiving the status confirmation signal acquires the status of the enable switch 65 and the portable-side emergency stop switch 66 and, according to this status, transmits the enable/disable signal and the emergency stop/non-stop signal described above to the second receiver 22 as a response to the status confirmation signal. The second receiver 22 instructs the crane controller 2 based on the response received from the portable remote controller 6 to perform emergency stop control of the stacker crane 12 or the like.

Next, the detailed communication between the portable remote controller 6 and the second receiver 22 will be described with reference to FIG. 11.

Figure 11:
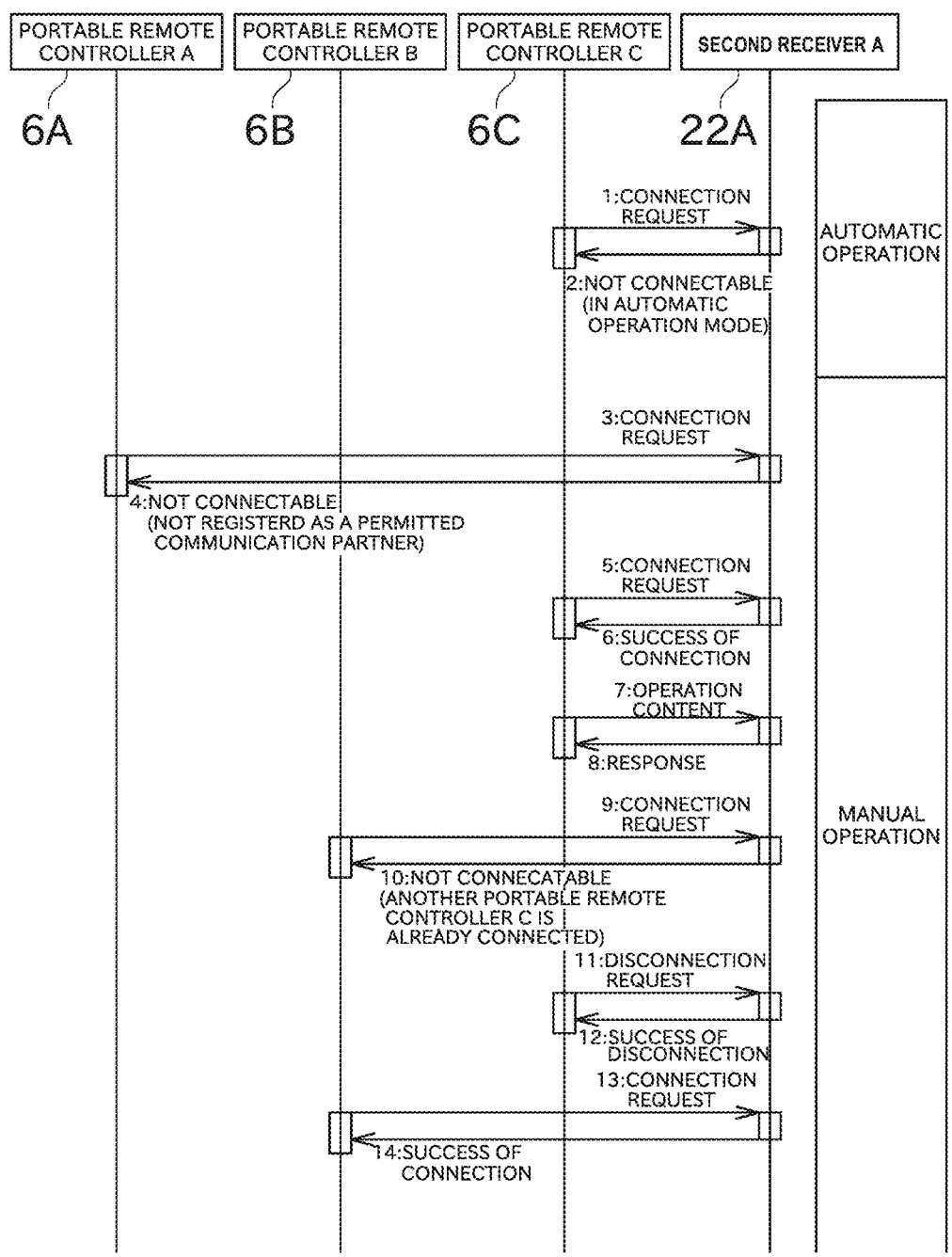
FIG. 11 is a sequence diagram showing processes in which a connection is performed between a portable remote controller and a second receiver to operate a stacker crane in a manual operation mode.

FIG. 11 shows that the operation of three portable remote controllers 6A, 6B, 6C and a second receiver 22 which are communication devices provided to control the stacker crane 12 in the manual operation mode. However, the stacker crane 12 initially operates in the automatic operation mode.

The second receiver 22A is registered as a permitted communication partner beforehand in the three portable remote controllers 6A, 6B, 6C. The two portable remote controllers 6B, 6C are registered as a permitted communication partner beforehand in the second receiver 22A and the remaining portable remote controller 6A is not registered as a permitted communication partner.

The tablet 5 is attached to the portable remote controller 6A, 6B, 6C, respectively, as shown in FIG. 7, and is electrically connected by the USB cable 64. Thus, the three portable operation interfaces 30 are provided. When the operator inputs various instructions to the portable remote controller 6A, 6B, 6C, the instructions are provided by operating the tablet 5.

In the example shown in FIG. 11, the operator first instructs the portable remote controller 6C to connect to the second receiver 22A. In response, the portable remote controller 6C transmits the connection request to the second receiver 22A (sequence number 1). The portable remote controller 6C includes information of the ID of the portable remote controller 6C in the connection request sent to the second receiver 22A.

The second receiver 22A communicates with the crane controller 2 to determine whether the connection establishment condition is satisfied, and inquiries about the current operation mode (step S102). At this time, the stacker crane 12 is in the automatic operation mode. Accordingly, the second receiver 22A transmits to the portable remote controller 6C as a response to the connection request that the connection cannot be performed because the stacker crane 12 is in the automatic operation mode (sequence number 2, step S103). The portable remote controller 6C, which receives the response, displays on the screen of the tablet 5 attached to the portable remote controller 6C that the portable remote controller 6C cannot connect to the second receiver 22A because the stacker crane 12 is in the automatic operation mode.

Then, the operator operates the appropriate tablet 5 to send the instruction to switch the operation mode of the stacker crane 12 from the automatic operation mode to the manual operation mode. The tablet 5 that sends the instruction to switch the operation mode may be the tablet 5 attached to any of the portable remote controllers 6A, 6B, 6C, or any other tablet 5. In response to the instruction, the mode switch signal is transmitted from the tablet 5 to the first receiver 21 (the signal is not shown in the sequence diagram in FIG. 11). The crane controller 2 switches the operation mode of the stacker crane 12 from the automatic operation mode to the manual operation mode according to the instructions of the first receiver 21 that receives the mode switching signal.

Next, another operator instructs the portable remote controller 6A to connect to the second receiver 22A. In response, the portable remote controller 6A transmits the connection request to the second receiver 22A (sequence number 3). The portable remote controller 6A includes information of the ID of the portable remote controller 6A in the connection request sent to the second receiver 22A.

The second receiver 22A determines whether the connection establishment condition is satisfied or not. The stacker crane 12 is in the manual operation mode. Next, the second receiver 22A determines whether the ID of the portable remote controller 6A included in the connection request is registered beforehand as a permitted communication partner (step S104). The ID of the portable remote controller 6A is not registered as a permitted communication partner in the second receiver 22A. Accordingly, the second receiver 22A transmits to the portable remote controller 6A as a response to the connection request that the connection cannot be performed because the portable remote controller 6A is not a permitted communication partner (sequence number 4, step S105). The portable remote controller 6A, which receives the response, displays on the screen of the tablet 5 attached to the portable remote controller 6A that the portable remote controller 6A cannot connect to the second receiver 22A because the portable remote controller 6A is not registered as a permitted communication partner in the second receiver 22A.

Next, the operator again instructs the portable remote controller 6C to connect to the second receiver 22A. In response, the portable remote controller 6C transmits the connection request to the second receiver 22A (sequence number 5). The portable remote controller 6C includes information of the ID of the portable remote controller 6C in the connection request sent to the second receiver 22A.

The second receiver 22A determines whether or not the connection establishment condition is satisfied. At this time, the stacker crane 12 is in the manual operation mode and the ID of the portable remote controller 6C included in the connection request is registered as a permitted communication partner beforehand. Next, the second receiver 22A determines whether a connection with another portable remote controller 6B is already started or not (step S106). At this time, the second receiver 22A is not connected to the other portable remote controller 6B. Since the connection establishment condition is satisfied, the second receiver 22A performs connection processing with the portable remote controller 6C (step S108) and transmits a response to the effect that the connection is completed to the portable remote controller 6C (sequence number 6). Accordingly, the wireless connection is established. That is, the above steps S102, S104, S106, and S108 correspond to the second wireless communication route establishment step.

Thereafter, the portable remote controller 6C transmits status of the operation contents (in other words, the enable switch 65 and the portable-side emergency stop switch 66) to the second receiver 22A (sequence number 7). When the second receiver 22A receives the operation contents (step S109), the second receiver 22A transmits a response thereto and controls the stacker crane 12 according to the received operation contents (sequence number 8).

In parallel with the communication of the sequence number 7 and the sequence number 8, an instruction to move the stacker crane 12 is transmitted from the tablet 5 to the first receiver 21 by an operator operating the tablet 5 (not shown in FIG. 11). The first receiver 21 outputs a signal corresponding to the operation to the crane controller 2. This enables manual remote operation of the stacker crane 12 by the tablet 5.

Next, another operator instructs the portable remote controller 6B to connect to the second receiver 22A while the portable remote controller 6C is connected to the second receiver 22A. In response, the portable remote controller 6B transmits a connection request to the second receiver 22A (sequence number 9).

The second receiver 22A determines whether or not the connection establishment condition is satisfied. At this time, the stacker crane 12 is in the manual operation mode and the ID of the portable remote controller 6B included in the connection request is registered as a permitted communication partner beforehand. However, in the determination of step S106, the second receiver 22A is already connected to the portable remote controller 6C. Accordingly, the second receiver 22A transmits to the portable remote controller 6B as a response to the connection request that the connection cannot be performed because the second receiver 22A is already connected to other portable remote controller 6C (sequence number 10, step S107). At this time, the second receiver 22A includes the ID of the portable remote controller 6C that is already connected to the second receiver 22A in the response sent to the portable remote controller 6B. The portable remote controller 6B, which receives the response, displays on the screen of the tablet 5 attached to the portable remote controller 6B that the portable remote controller 6B cannot connect to the second receiver 22A because the second receiver 22 is already connected to the portable remote controller 6C.

Next, the operator instructs the portable remote controller 6C to disconnect the wireless connection with the second receiver 22A. In response, the portable remote controller 6C transmits the disconnection request to the second receiver 22A (sequence number 11). The second receiver 22A, which receives the disconnection request, processes to disconnect the wireless connection and transmits a response to the effect that the disconnection is completed to the portable remote controller 6C (sequence number 12). This causes the wireless connection to be disconnected.

Thereafter, when the operator instructs the portable remote controller 6B to connect to the second receiver 22A, the connection is completed because the connection between the portable remote controller 6C and the second receiver 22A is already finished (sequence numbers 13 and 14).

The above processes allow the manual operation of the stacker crane 12 by the combination of the portable remote controller 6 and the tablet 5 to be performed only in appropriate circumstances. If the manual operation is not possible, the reason is displayed on the tablet 5 so that the operator is able to easily understand the work required for the manual operation.

After the required maintenance work is completed, the operator operates the tablet 5 to switch the stacker crane 12 from the manual operation mode to the automatic operation mode.

However, it is necessary that the wireless connection between the second receiver 22A and all of the stationary remote controllers 4 registered as permitted communication partners is established, that is, a condition able to start the automatic operation mode. This can ensure that the operation of the stationary-side emergency stop switch 41 provided by the stationary remote controller 4 is effective in the automatic operation mode.

Another condition to be able to start the automatic operation mode further includes that no portable remote controller 6 is wirelessly connected to the second receiver 22A. Accordingly, the automatic operation mode is able to be started after the stacker crane 12 cannot be manually operated by the tablet 5.

While preferred embodiments and variations of the present invention have been described above, the features described above may be modified, for example, as follows.

The second receiver 22 may repeatedly transmit to each portable remote controller 6, at predetermined time intervals, a signal including information in which the operation mode of the stacker crane 12 is the automatic operation mode or the manual operation mode. In this case, the portable remote controller 6 may not send the connection request to the second receiver 22 when the stacker crane 12 is in the automatic operation mode, based on the information received from the second receiver 22.

The second receiver 22 may repeatedly transmit, at predetermined time intervals, appropriate signal to indicate acceptance of the connection only to the portable remote controller 6 which is registered as a permitted communication partner. In this case, the portable remote controller 6 may not send the connection request to the second receiver 22 if the signal is not received from the second receiver 22.

When the second receiver 22 establishes the wireless connection with a certain portable remote controller 6, the second receiver 22 may repeatedly (continuously) transmit an appropriate signal indicating that the second receiver 22 establishes the wireless connection with the portable remote controller 6 to other portable remote controllers 6 at predetermined time intervals. In this case, the portable remote controller 6, which recognizes that the second receiver 22 is already connected to other portable remote controller 6, may not send a connection request to the second receiver 22.

The portable remote controller 6 described above determines the connection establishment condition at the portable remote controller 6 end and not to send the connection request in case of not satisfying the connection establishment condition, and the portable remote controller 6 may send the connection request to the second receiver 22 due to an error. To reliably prevent the establishment of the wireless connection that is not intended by the operator, the process of FIG. 10 is preferably performed again on the second receiver 22 end to determine the connection establishment condition, for example.

Any one of the first, second, and third conditions that is included in the connection establishment condition may not be included in the connection establishment condition.

Other conditions may be included in the connection establishment condition. For example, according to one implementation of the connection establishment condition, the fourth condition, in which the portable-side emergency stop switch 66 provided by the portable remote controller 6 is not pressed, needs to be satisfied for the connection establishment condition to be satisfied.

In the portable remote controller 6, one of the enable switch 65 and the portable-side emergency stop switch 66 may be omitted.

Instead of a stationary remote controller 4, an emergency stop switch may be provided which is connected to the crane controller 2 via a wired cable.

The switching of the operating mode of the stacker crane 12 is not limited to being performed by the tablet 5 of the portable operation interface 30. For example, the mode may be switched between the automatic operation mode and the manual operation mode by operating a switch on an abbreviated operation panel provided by the stacker crane 12.

The first wireless communication route may be used to transmit signals to the first receiver 21 other than the signal for manual operation of the stacker crane 12. The second wireless communication route may be used to transmit signals other than the enable signal and the emergency stop signal to the second receiver 22.

The safety signal system 20 can also be applied to industrial machines other than the stacker crane 12.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A method for establishing wireless communication for establishing a second wireless communication route between an operation-side communication device and a machine-side communication device, the operation-side communication device transmitting, via a first wireless communication route, an instruction to switch an operation mode to an industrial machine including an automatic operation mode and a manual operation mode, the machine-side communication device being connected to the industrial machine, the method comprising:
- a connection request step in which the operation-side communication device wirelessly transmits a connection request to establish wireless communication in the second wireless communication route to the machine-side communication device; and
- a second wireless communication route establishment step in which the machine-side communication device determines whether a connection establishment condition is satisfied or not, and if the connection establishment condition is satisfied, the machine-side communication device establishes the wireless communication in the second wireless communication route with the operation-side communication device in response to the connection request; wherein
- in the second wireless communication route establishment step, in a case where the connection establishment condition is not satisfied, the wireless communication in the second wireless communication route with the operation-side communication device is not established even if the connection request is transmitted;
- satisfying a first condition which is a condition in which the industrial machine is in the manual operation mode is required to satisfy the connection establishment condition, and the operation mode of the industrial machine is able to be switched by a transmission of the instruction to switch the operation mode via the first wireless communication route.

2. The method according to claim 1, wherein
the connection request includes operation-side communication device identification information to identify the operation-side communication device; and
in order for the connection establishment condition to be satisfied, in addition to satisfaction of the first condition being satisfied, a second condition is required to be satisfied, and the second condition is a condition in which the operation-side communication device identification information included in the connection request is registered beforehand in the machine-side communication device as a permitted communication partner.

3. The method according to claim 1, wherein in order for the connection establishment condition to be satisfied, in addition to satisfaction of the first condition, a third condition is required to be satisfied, and the third condition is a condition in which the wireless communication in the second wireless communication route is not already established with another operation-side communication device.

4. The method according to claim 3, wherein
if the third condition is not satisfied, the machine-side communication device wirelessly transmits the operation-side communication device identification information to identify the other operation-side communication device in which wireless communication is already established with the machine-side communication device; and
the operation side communication device displays the identification information of the other operation-side communication device received from the machine-side communication device on a display of the operation-side communication device.

5. The method according to claim 1 wherein in the second wireless communication route establishment step:
the machine-side communication device wirelessly transmits information indicating a reason why the connection establishment condition is not satisfied to the operation-side communication device when the connection establishment condition is not satisfied; and
the operation-side communication device displays the reason received from the machine-side communication device on a display of the operation-side communication device.

6. The method according to claim 1, wherein the operation-side communication device includes:
a portable terminal including a first operation interface; and
a remote controller connecting to the portable terminal via a wired cable and including a second operation interface; wherein
the industrial machine is connected to a reception communication device that receives a switching instruction of the operation mode transmitted by the operation-side communication device;
the first wireless communication route is established between the portable terminal and the reception communication device, and the first operation information indicating an operation of the first operation interface is transmitted from the portable terminal; and
the second wireless communication route is established between the remote controller and the machine-side communication device, and the second operation information indicating an operation of the second operation interface is transmitted from the remote controller.

7. The method according to claim 6, wherein
the portable terminal is a tablet; and
the first operation interface is a touch panel integrated with a display of the portable terminal.

8. The method according to claim 6, wherein the second operation information includes an enable signal that enables the first operation information.

9. The method according to claim 6, wherein the second operation information includes an emergency stop signal.

10. A wireless communication system comprising:
an operation-side communication device to transmit, via a first wireless communication route, an instruction to switch an operation mode to an industrial machine including an automatic operation mode and a manual operation mode; and
a machine-side communication device connected to the industrial machine; wherein
when establishing a second wireless communication route between the operation-side communication device and the machine-side communication device:
the operation-side communication device wirelessly transmits a connection request which is a request to establish wireless communication in the second wireless communication route to the machine-side communication device;
the machine-side communication device determines whether a connection establishment condition is satisfied or not, and if the connection establishment condition is satisfied, the machine-side communication device establishes the wireless communication in the second wireless communication route with the operation-side communication device in response to the connection request; and
the machine-side communication device determines whether a connection establishment condition is satisfied or not, and if the connection establishment condition is not satisfied, the wireless communication in the second wireless communication route with the operation-side communication device is not established even if the connection request is transmitted;
satisfying a first condition which is a condition in which the industrial machine is in the manual operation mode is required to satisfy the connection establishment condition, and the operation mode of the industrial machine is able to be switched by a transmission of the instruction to switch the operation mode via the first wireless communication route.

* * * * *